United States Patent Office
3,180,085
Patented Apr. 27, 1965

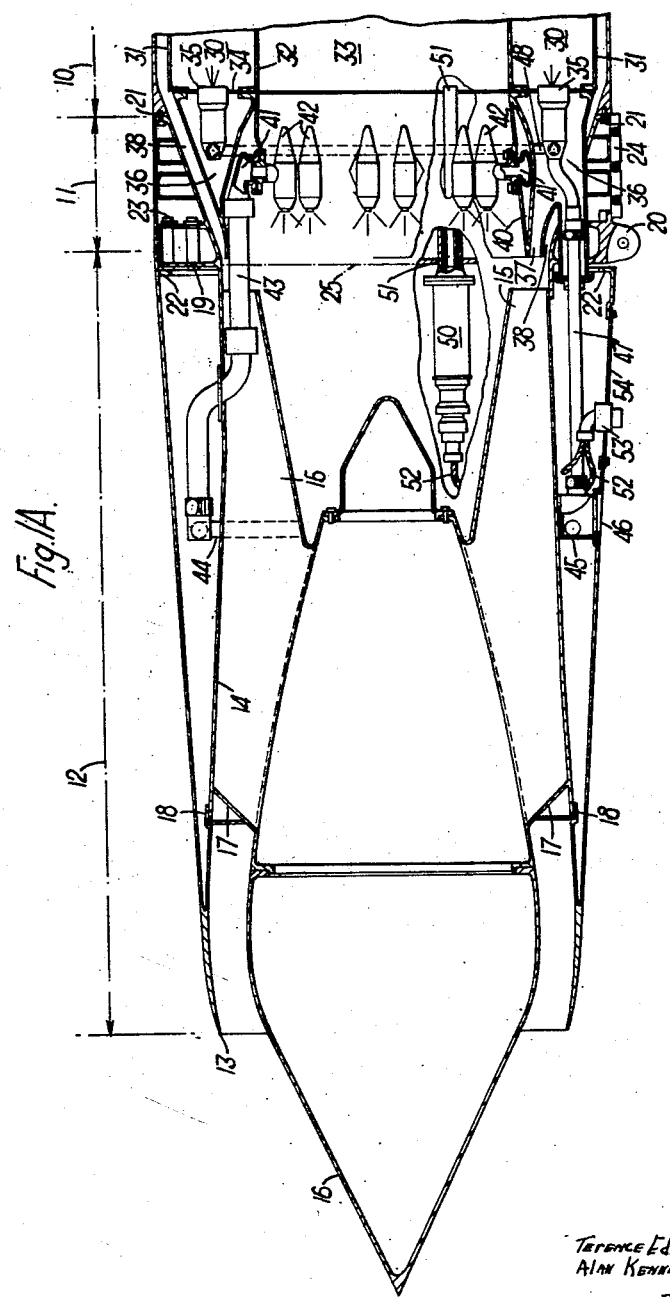

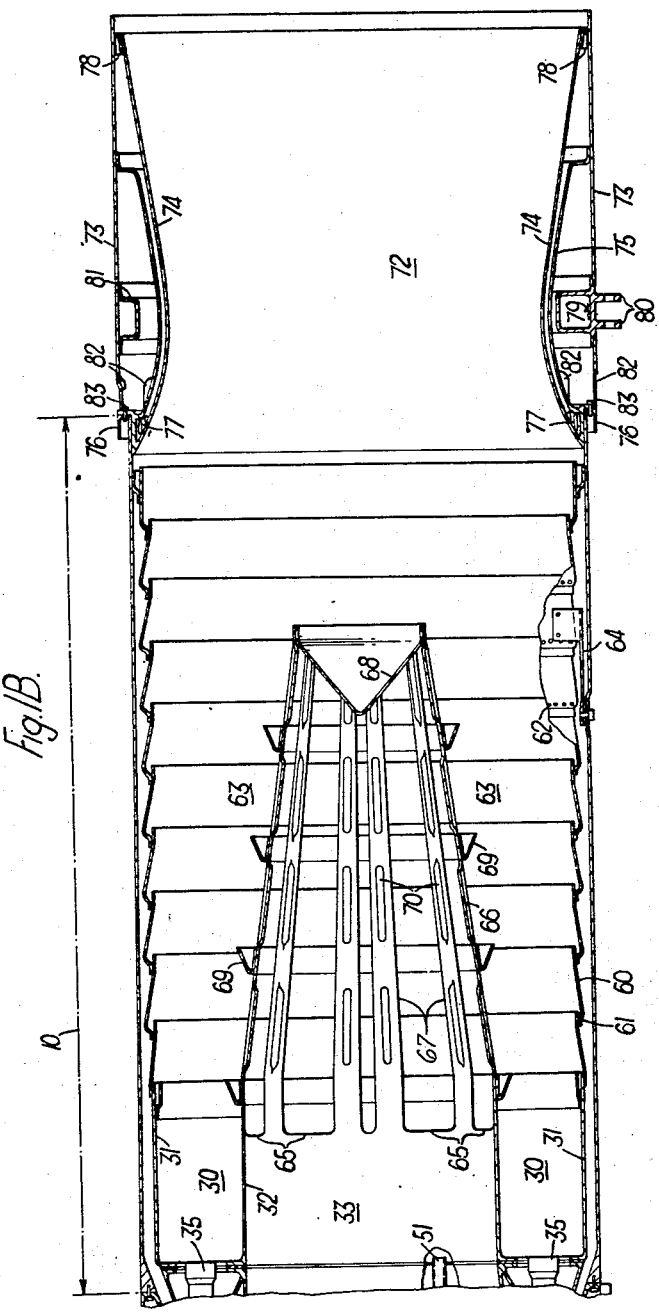

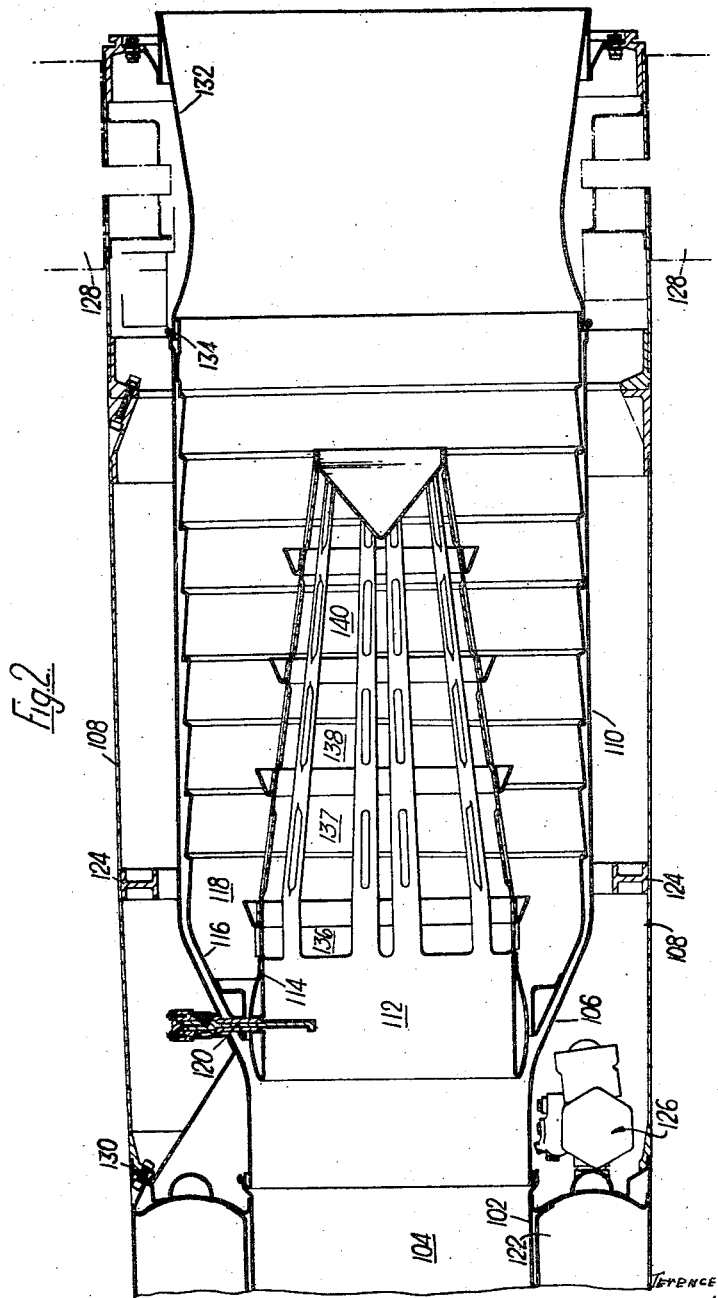

3,180,085
RAMJET ENGINE
Terence Edward Gouvenot Gardiner and Alan Kenneth Sargent, Bristol, England, assignors to Bristol Siddeley Engines Limited, Bristol, England, a company of Great Britain
Filed Apr. 23, 1962, Ser. No. 189,503
Claims priority, application Great Britain, Apr. 28, 1961, 15,499/61
3 Claims. (Cl. 60—35.6)

According to the invention a ramjet engine comprises a circular section air duct having an enlarged portion along part of its length; and annular flame tube structure within said enlarged portion having inner and outer walls mutually diverging in the downstream direction from a substantially closed upstream end to form a pilot combustion zone downstream from said upstream end, the inner wall defining a central main air flow passage. The part of the inner wall downstream of the pilot combustion zone is formed of longitudinally continuous circumferentially spaced strips and longitudinally spaced rings interconnecting said strips so as to form relatively large approximately rectangular openings. The outer wall is spaced from the wall of the enlarged part of the air duct so as to form an outer passage therewith and the outer wall has therein downstream of the pilot combustion zone relatively small openings directed along its inner surface in the downstream direction. Means are provided for dispersing part of the fuel supply into said pilot combustion zone, and means for dispersing the remainder of the fuel supply into said central main air flow passages, and for supplying fuel-free air to said outer passage to flow therethrough, so that fuel-air mixture flows into said flame tube structure through said approximately rectangular openings.

Preferably, the outer wall of the flame tube structure is spaced from the air duct wall to form a passage for the conveyance of cooling air free from fuel to heat shielding surrounding a main combustion zone downstream from the pilot combustion zone.

The inner wall of the air duct may rejoin the outer casing at a position rearwards of the rear end of the center body; in which case the air duct wall rearwards from this point is formed by the outer casing itself. Alternatively, the inner wall having diverged towards the outer casing to form an enlargement in the air duct may extend rearwards parallel to the outer casing, in which case it continues to form the air duct wall.

In a preferred arrangement, the space formed between the outer casing and the inner wall of the air duct contains electrically-operated means for projecting an ignition flame into the pilot combustion zone, electrical and fuel inlet connection devices arranged for connection to electrical and fuel supply systems, wiring and piping connecting the electrical and fuel inlet connection devices with the ignition and fuel dispersing means respectively, and the outer casing has parts which are removable or openable for the inspection and servicing of the ignition means, wiring and fuel piping connections.

In a preferred arrangement intended for a missile comprising a built-in ramjet engine, the inner wall of the air duct, having diverged towards the outer casing from a position rearwards of the rear end of the center body to form an enlargement in the air duct, extends rearwards parallel to the outer casing, and the space between the inner wall and the outer casing contains a fuel tank, and actuating equipment for control surfaces mounted on the missile.

Alternatively, part of the space between the outer casing and the inner wall can also be used to accommodate a strong ring structure by which, if the engine is used mounted externally on a vehicle, the forward end of the engine may be attached to the body of the vehicle.

If the interior of the center body can be kept free from fuel system equipment and other auxiliaries, the center body can be made lighter in weight and can be supported by thinner vanes, causing less disturbance in the air flow through the engine. However, the space can be made available if necessary for auxiliary equipment such as devices for metering fuel in proportion to air flow through the engine, inert gas containers for pressurizing the fuel tanks, and anti-radar echo devices.

One example of a construction according to the invention will be described with reference to FIGURES 1A and 1B, being the drawings accompanying the provisional specification. A further example of construction will be described with reference to FIGURE 2, being the drawing accompanying the present specification. In these drawings:

FIGURE 1A is a longitudinal section through the forward half of the engine, the plane of section above the axial center line being at 120° inclination to the plane of section below the axial center line;

FIGURE 1B is a similar section through the rear half of the engine;

FIGURE 2 is a similar longitudinal section through the rear half of an engine intended for a missile comprising a built-in ramjet engine.

With reference to FIGURES 1A and 1B, the outer casing of the engine comprises a cylindrical rear part 10, a removable access band 11 and a forward part 12 which tapers slightly forwards to an intake opening lip 13. An inner air duct wall 14 extends rearwards from the lip 13 and departs at a small angle from the casing part 12 until a position 25 opposite the rear end of the latter is reached. From thence the inner wall approaches more sharply towards the outer casing and rejoins the latter at the forward end of the part 10. The inner air duct wall 14 is a pressure-tight structure, and supports by means of three vanes 15 a forwardly and rearwardly pointed center body 16, which is of light construction and in this example contains no auxiliary equipment. The rear end of the center body is upstream of the position 25 by a distance between a half and a third of the diameter of the inner air duct at the position 25. Forward of the leading edges 17 of the vanes, the wall 14 is divided by a circumferential sliding joint 18. The part of the wall 14 forward of the sliding joint is permanently connected to the outer casing part 12, while the rear part is permanently connected to a stiff box-section ring 19, provided on one side of the engine with lugs 20 extending outwards through the casing, by means of which the engine may be attached to a vehicle which it is required to propel. At its rear end, the wall part 14 is connected to the casing part 10 by bolts 21, while the casing part 12 has a flange 22 by which it is secured to the forward side of the ring 19 by bolts 23. The band 11 is split longitudinally adjacent to the lugs 20, and the ends are drawn together by bolts or toggle devices (not shown) acting on flanges 24. The band is sufficiently flexible to open up far enough to allow of its removal when the draw bolts have been released. The bolts 21 and 23 are then accessible for removal. Removal of the bolts 23 permits the forward casing part 12 to be slid off aixally, the wall 14 separating at the sliding joint 18.

An annular pilot combustion zone 30 is arranged within the forward end of the casing part 10 and is defined by an outer cylindrical wall 31, spaced from the casing 10, and by an inner cylindrical wall 32 which also defines part of a central main air flow passage 33. The forward end of the pilot combustion zone 30 is defined by a flat ring plate 34, in which is mounted a circular series of sprayers 35 for dispersing liquid fuel into the combustion chamber. Between the sprayers, the ring plate 34 is provided with holes for the passage of air into the pilot combustion zone 30 from an annular air collection chamber 36 on the forward side of the ring plate, the collection chamber having a restricted opening 37 at its forward end to control the amount of air admitted. Some of the remaining air passes through a passage 38 surrounding the chamber 36, into the space between the casing 10 and the outer wall 31 of the pilot combustion zone, but the main part flows through the central air flow passage 33. The part flowing through the space between the casing 10 and the wall 31 is free from fuel and is used for cooling and heat shielding as will be presently described.

The inner wall 40 of the collection chamber 36 is hollow and contains a fuel manifold 41 on which are mounted a circular series of sprayers 42 for dispersing liquid fuel into the central air flow passage 33. These sprayers are of the kind having a conical spray-dispersing anvil concentrically arranged in a discharge orifice, and are arranged to spray the fuel in the upstream direction.

The fuel dispersing means may be arranged alternatively for downstream injection or for simultaneous upstream and downstream injection, or progressive dispersing means of the kind described in British patent specification No. 841,872 may be used. These devices comprise a main conduit, which would be arranged to project radially into the main air flow passage 33, and two or more short straight cross conduits open at both ends and aligned with the direction of air flow, fuel being admitted into the main conduit through a restrictor valve having a pressure-controlled orifice.

From the fuel manifold 41 two fuel supply pipes 43 pass forwards through openings into the rear ends of two of the vanes 15 and then outwards through the wall 14 to join a circular ring manifold 44 arranged in the space between the wall 14 and the casing part 12. Fuel pressurising or restrictor valves may be incorporated in the pipes 43 to maintain the required pressure-flow characteristic irrespective of the kind of fuel dispersing means used. Forward of the mounting lugs 20 the manifold 44 is provided with a cylindrical socket 45 having an open end directed outwards in line with a hole 46 in the casing part 12. This socket is arranged to receive an end fitting (having a suitable peripheral sealing ring) on a fuel supply pipe from the vehicle, and constitutes a fuel inlet connection device. Another fuel supply pipe 47 extends from the socket 45 rearwards through the space between the wall 14 and the casing part 12 into the air collection chamber 36 where it is connected to a circular ring manifold 48 supplying all the pilot sprayers 35.

Also mounted in the space between the wall 14 and the casing part 12 are at least two electrically-operated pyrotechnic flare igniters 50. The igniters are duplicated to ensure against a misfire, and are each provided with two independent firing circuits all energised simultaneously. The igniters are mounted on the box section ring 19, and have flame projection tubes 51 passing through the ring 19 and the air collection chamber 36 into the annular pilot combustion zone 30. The electrical leads 52 from the igniters are taken to an electrical connection socket 53 mounted on a removable panel 54 in line ahead of the engine mounting lugs 20. Further removable panels (not shown) are provided in way of the igniters to allow the cartridges to be rapidly replaced. During storage, the igniter cartridges are replaced by dummies to which the electrical lead sockets are fitted as safe anchorages. This is a safety measure to prevent inadvertent ignition during testing of the electrical circuits or by radio hazard. A thorough inspection and overhaul of the electrical and fuel distribution equipment may be made by sliding the casing part off forwards as previously described. The engine is intended for mounting on a strut projecting from the body or wing or a winged vehicle, the mounting lugs 20 and the fuel and electrical connection devices 45 and 53 then lying within the contour of a fairing forming part of the strut.

As shown in FIGURE 1B the outer wall 31 of the annular pilot combustion zone 30 is continued rearwards nearly to the end of the casing part 10 by a series of overlapping rings 60 each of which is slightly rearwardly convergent and has at its forward end an inwardly turned flange 61 engaging the preceding ring near its rear end. Holes 62 are provided in the flanges 61 for passage of cooling air from the space between the casing 10 and the wall 31. This structure constitutes heat shielding for a main combustion zone 63 and is partly supported from the casing part 10 by a number of resilient strip members 64. Air admixed with fuel passes from the central airflow passage into the combustion zone 63 through openings 65 in a rearwardly convergent perforated flame tube structure 66 carried by the rear end of the inner wall 32 of the annular pilot combustion zone 30. The structure 66 is composed of a number of longitudinal strips 67 attached at their rear ends to the periphery of a conical cup 68 with its apex directed forwardly. Surrounding the strips at intervals along their length are a number of V-shaped flame-holding gutters 69 with their apexes also directed forwardly. The parts of the strips between the gutters are stiffened by swagings 70. All the openings 65 are of the same width circumferentially, the opening on the axial center line in the drawing appearing narrower merely because, as previously mentioned, the top and bottom half section planes are at an angle of 120 to one another.

A convergent-divergent propulsion nozzle 72 is attached to the rear end of the casing part 10 and comprises an outer wall 73, which is slightly larger in diameter than the part 10, an inner wall 74 defining the contour of the nozzle, and a cooling air guide wall 75 which closely surrounds the inner wall 74 over about the first two thirds of its length and is then flanged outwards and joined to the outer wall 73. Boundary layer air is collected by a flange 76 forming in effect a forward continuation of the outer wall 73 overlapping the end of the casing part 10, and passes through holes 77 into the space between the inner wall 74 and the air guide wall 75. Good heat transfer conditions are thus provided for cooling the hottest part of the inner wall 74. The cooling air finally leaves the nozzle through a gap between the rear ends of the inner and outer walls. The rear end of the inner wall is not attached to the outer wall but is centered therein by a circular series of U-shaped members 78 attached by their bases to the inner wall. A mounting fitting 79 is accommodated in the space between the outer wall 73 and the air guide wall 75 and has attachment lugs 80 projecting through the outer wall. The mounting fitting is extended round the inside of the outer wall in the form of a "top hat" section stiffening ring 81. Holes 82 in the outer casing provide access for attachment bolts 83 securing the nozzle assembly to the flange 76 at the rear end of the casing part 10.

FIGURE 2 shows the rear half of an engine intended to form part of a missile comprising a built-in ramjet. The arrangement is similar to that described in FIGURES 1A and 1B. An inner wall 102 of an air duct 104 diverges outwards at 106 towards an outer casing 108. The inner wall then proceeds rearwards parallel to the outer casing 108 at 110. A flame tube structure 112 has an inner wall 114 and an outer wall 116, the upstream end of the flame tube structure between the inner wall 114 and the outer wall 116 constituting a pilot combustion zone 118. A fuel injector 120 disperses a pilot supply of fuel into the pilot combustion zone 118, and a main supply of fuel into the main air flow passage of the duct 104. The annular space between the inner wall 102 and the outer casing 108 houses a fuel tank 122. Also in this annular space, between the fuel tank 122 and a frame member 124, are housed electrically-operated means for projecting an ignition flame into the pilot combustion equipment, electrical and fuel inlet connection devices arranged for connection to electrical and fuel supply systems, and wiring and piping connecting the inlet and fuel connection devices with the ignition and fuel dispersing means respectively, all indicated generally at 126. The annular space rearwards of the frame member 124 houses actuating equipment for control surfaces indicated at 128.

Access to the equipment housed between the fuel tank 122 and the frame member 124 is obtained by releasing bolts 130, and sliding the outer casing, including a nozzle 132, rearwards away from a seal 134.

Forward of the fuel tank 122, guidance equipment and a warhead (not shown) are housed.

An annular pilot combustion zone has an advantage over a central pilot combustion chamber in that the quantity of pilot air-fuel mixture which can be burnt can be greatly increased, without the transverse dimension of the combustion zone becoming so excessive that fresh quantities of air-fuel mixture admitted through the perforations in the flame tube wall cannot penetrate well into the interior.

With reference to FIGURE 2, in operation, a small amount of fresh air-fuel mixture enters the pilot combustion zone 118 through first perforations 136 and second perforations 137 in the flame tube structure 112, and thus joins a toroidal vortex in the pilot combustion zone 118. A further amount of mixture enters through third perforations 138, and penetrates across to the outer wall 116 of the flame tube structure 112, and is ignited by the tail flame from the vortex. The burning gas then returns towards the center of the air duct, crossing the path of more fresh air-fuel mixture entering through fourth perforations 140 and igniting this fresh mixture. This general pattern continues until the end of the flame tube structure is reached.

We claim:

1. A ramjet engine comprising a circular section air duct having an enlarged portion along part of its length; an annular flame tube structure within said enlarged portion comprising inner and outer walls mutually diverging in the downstream direction from a substantially closed upstream end to form a pilot combustion zone downstream from said substantially closed upstream end, the inner wall defining a central main air flow passage, the part of the inner wall downstream of the pilot combustion zone being formed of longitudinally continuous circumferentially spaced strips and longitudinally spaced rings interconnecting said strips so as to form relatively large approximately rectangular openings, the outer wall being spaced from the wall of the enlarged part of the air duct so as to form an outer passage therewith and the outer wall having therein downstream of the pilot combustion zone relatively small openings directed along its inner surface in the downstream direction; means for dispersing part of the fuel supply into said pilot combustion zone; means for dispersing the remainder of the fuel supply into said central main air flow passage; and means to supply fuel-free air to said outer passage to flow therethrough, whereby fuel-air mixture flows into said flame tube structure through said approximately rectangular openings.

2. A ramjet engine according to claim 1, including an outer casing spaced outwardly from the enlarged portion of the air duct to enclose a space, and auxiliary equipment in said space.

3. A ramjet engine according to claim 2, including mounting and attachment means for said outer casing permitting the outer casing to be slid off axially to allow inspection and servicing of said auxiliary equipment.

References Cited by the Examiner

UNITED STATES PATENTS

| | | | |
|---|---|---|---|
| 2,540,594 | 2/51 | Price. | |
| 2,614,384 | 10/52 | Feilden. | |
| 2,828,609 | 4/58 | Ogilvie. | |
| 2,927,427 | 3/60 | Mestre | 60—35.6 X |
| 3,092,960 | 6/63 | Worley et al. | 60—35.6 |

SAMUEL LEVINE, *Primary Examiner.*

JULIUS E. WEST, ABRAM BLUM, *Examiners.*